United States Patent
Shimoda et al.

(10) Patent No.: US 8,620,844 B2
(45) Date of Patent: Dec. 31, 2013

(54) NEURON DEVICE FOR SIMULATING A NERVE CELL AND NEURAL NETWORK DEVICE, INTEGER CLUSTER DEVICE, FEEDBACK CONTROL DEVICE, AND COMPUTER PROGRAM PRODUCT THEREOF

(75) Inventors: Shingo Shimoda, Wako (JP); Hidenori Kimura, Wako (JP); Masaaki Yamaoka, Toyota (JP); Hideki Kajima, Toyota (JP)

(73) Assignees: Riken, Saitama (JP); Toyota Jidosha Kabushiki Kaisha, Aichi (JP)

( * ) Notice: Subject to any disclaimer, the term of this patent is extended or adjusted under 35 U.S.C. 154(b) by 947 days.

(21) Appl. No.: 12/680,678

(22) PCT Filed: Sep. 30, 2008

(86) PCT No.: PCT/JP2008/067774
§ 371 (c)(1), (2), (4) Date: Mar. 29, 2010

(87) PCT Pub. No.: WO2009/044751
PCT Pub. Date: Apr. 9, 2009

(65) Prior Publication Data
US 2010/0217733 A1    Aug. 26, 2010

(30) Foreign Application Priority Data
Oct. 1, 2007   (JP) .................................. 2007-257123

(51) Int. Cl.
G05B 13/02   (2006.01)
(52) U.S. Cl.
USPC .......................................................... 706/23
(58) Field of Classification Search
USPC .......................................................... 706/23
See application file for complete search history.

(56) References Cited

U.S. PATENT DOCUMENTS

| | | | | |
|---|---|---|---|---|
| 4,874,963 A | * | 10/1989 | Alspector | 706/34 |
| 4,975,961 A | * | 12/1990 | Sakoe | 704/232 |
| 5,446,829 A | * | 8/1995 | Wang et al. | 706/21 |

FOREIGN PATENT DOCUMENTS

JP   5-234009   9/1993

(Continued)

OTHER PUBLICATIONS

"Variable threshold as a model for selective attention, (de) sensitization, and anesthesia in associative neural networks", L. Wang, J. Ross, Biological Cybernetics, Jan. 1991, vol. 64, Issue 3, pp. 231-241.*

"A Self-Organizing Model of the Topographic Mapping by Excitatory Waves With Width Varying", J. Shirakura, et al., Technical Report of IEICE, NC95-17, 1996, pp. 53-60.

(Continued)

*Primary Examiner* — Kakali Chaki
*Assistant Examiner* — Mai T Tran
(74) *Attorney, Agent, or Firm* — Brundidge & Stanger, P.C.

(57) ABSTRACT

Using variable neuron thresholds and extended Hebb's rule in a neural network, a neuron device for simulating a nerve cell includes a threshold storage unit storing a threshold variable $\theta$ and threshold coefficients $\Delta\theta 1$ and $\Delta\theta 2$; an input reception unit receiving one or more input signal values at predetermined time intervals; an output unit outputting an output signal value "1" indicating that the neuron device is firing when the sum total s of received input signal values is equal to or greater than the value of the stored threshold variable $\theta$, or a value "0" indicating that the neuron device is resting; and a threshold updating unit calculating $\Delta\theta 1 X + \Delta\theta 2(X-1)$ using the output signal value X and the stored threshold coefficients $\Delta\theta 1$ and $\Delta\theta 2$ and updating the value of the threshold variable $\theta$ stored in the threshold storage unit by increasing it by the calculation result.

7 Claims, 9 Drawing Sheets

(56) References Cited

FOREIGN PATENT DOCUMENTS

| | | | | |
|---|---|---|---|---|
| JP | 07-141313 | * 11/1993 | .............. | G06F 15/18 |
| JP | 7-141313 | 6/1995 | | |
| JP | 7-319507 | 12/1995 | | |
| WO | 2004/104917 A1 | 12/2004 | | |

OTHER PUBLICATIONS

"Neural Computation Scheme of Compound Control: Tacit Learning for Bipedal Locomotion", S. Shimoda, et al., SICE Journal of Control, Measurement, and System Integration, vol. 1, No. 4, pp. 275-283, Apr. 2008.

"Robot Control Based on Compound Control Theory", S. Shimoda, et al., Mar. 2006, 16-17 in SAGA., pp. 269-276.

* cited by examiner (a) WEIGHT OF END-EFFECTOR (b) TRAJECTORY OF COD

NEURON DEVICE FOR SIMULATING A NERVE CELL AND NEURAL NETWORK DEVICE, INTEGER CLUSTER DEVICE, FEEDBACK CONTROL DEVICE, AND COMPUTER PROGRAM PRODUCT THEREOF

BACKGROUND OF THE INVENTION

1. Field of the Invention

The present invention relates to a neuron device, neural network device, nonnegative integer coding device, integer cluster device, and feedback control device in which variable neuron thresholds are used, the Hebb's rule is extended, and integer representation is manipulated in a neural network so as to be preferable for proper control, and to a computer-readable information recording medium on which programs for realizing them on a computer are recorded.

2. Description of Related Art

In the prior art, techniques for control by means of the neural network have been proposed wherein the output and input of virtual "neurons" used as a control unit and imitating the behavior of a neural cell in a simple mathematical model are connected with a weight and the weight is changed for learning. Such a technique is disclosed in the Non-Patent Literature 1 below.

The Non-Patent Literature 1 proposes a technique using a bursting model for learning the movement in conveying an object through the autonomous learning activity of a neural cell model.

Non-Patent Literature 1: Shingo Shimoda, Takeshi Asahi, Hideo Fujimoto, Hideki Kimura, "Robot Control based on Compound Control Theory," the 11th Robotics Symposia, 2006.

BRIEF SUMMARY OF THE INVENTION

Notwithstanding the technology disclosed in Non-Patent Literature 1, as to which type of neuron models to establish, neuron models are also still under comparative investigation in pursuit of the structure of highly desired neural networks using new models.

The present invention is made to resolve the above problem and the purpose of the present invention is to provide a neuron device, neural network device, nonnegative integer coding device, integer cluster device, and feedback control device in which variable neuron thresholds are used, the Hebb's rule is extended, and integer representation is manipulated in a neural network so as to be preferable for proper control, and a computer-readable information recording medium on which programs for realizing them on a computer are recorded.

The neuron device according to the first aspect of the present invention simulates a neural cell, comprises a threshold storage unit, an input reception unit, an output unit, and a threshold updating unit, and has the following structure.

The threshold storage unit stores a threshold variable $\theta$ and two threshold coefficients $\Delta\theta 1$ and $\Delta\theta 2$.

The input reception unit receives one or multiple input signal values at predetermined time intervals.

The output unit outputs, as respective output signal values, a value "1" for indicating that the neuron device is firing when the sum total of received input signal values is equal to or greater than the value of the stored threshold variable $\theta$, or a value "0" for indicating that the neuron device is resting.

The threshold updating unit calculates:

$$\Delta\theta 1 X + \Delta\theta 2 (X-1)$$

using the output signal value X and stored threshold coefficients $\Delta\theta 1$ and $\Delta\theta 2$, and updates the value of the threshold variable $\theta$ stored in the threshold storage unit by increasing it by the calculation result.

The neural network device according to another aspect of the present invention comprises a weight storage unit, two neuron devices described above (one is termed "the input neuron device" and the other is termed "output neuron device" hereafter), a mediation input reception unit, and a weight updating unit, and has the following structure.

The weight storage unit stores a weight w and two weight coefficients $\Delta w 1$ and $\Delta w 2$.

The mediation input reception unit receives a mediation signal value at time intervals of the input and output neuron devices receiving input signal values and outputting output signal values.

A value wu obtained by multiplying an output signal value u from the input neuron device by the stored weight w is given to the output neuron device as an input signal value.

The weight updating unit calculates:

$$\Delta w 1 x u z + \Delta w 2 (x u z - 1)$$

using the output signal value u from the input neuron device, output signal value x from the output neuron device, received mediation signal value z, and stored weight coefficients $\Delta w 1$ and $\Delta w 2$, and updates the weight w stored in the weight storage unit by increasing it by the calculation results.

The nonnegative integer coding device according to another aspect of the present invention comprises the N neuron devices described above, a nonnegative real number reception unit, and a nonnegative integer output unit, and has the following structure.

The nonnegative real number reception unit receives one or multiple nonnegative real number signal values at time intervals of the N neuron devices receiving input signal values and outputting output signal values, and outputs the sum total u of the nonnegative real number signal values to the N neuron devices as an input signal value.

The nonnegative integer output unit outputs the sum total of the output signal values from the N neuron devices as a nonnegative integer signal value.

Furthermore, the N neuron devices store 1, 2, ..., N as the initial value of the threshold variable $\theta$ and store "0" as the values of the threshold coefficients $\Delta\theta 1$ and $\Delta\theta 2$ in their threshold storage units.

The integer cluster device of the present invention comprises two nonnegative integer coding devices described above (one is termed "the positive coding device" and the other is termed "the negative coding device" hereafter), a real number reception unit, a positive neural network, a negative neural network, and an integer arithmetic operation output unit, and has the following structure.

The real number reception unit receives one or multiple real number signal values at time intervals of the two nonnegative integer coding devices receiving nonnegative real number signal values and outputting nonnegative integer signal values. When the sum total v of the real number signal values is:

(a) nonnegative, the real number reception unit supplies a real number value v to the positive coding device as a nonnegative real number signal value and "0" to the negative coding device as a nonnegative real number signal value, or (b) negative, the real number reception unit supplies "0" to the positive coding device as a nonnegative real number signal value and a real number value $-v$ to the negative coding device as a nonnegative real number signal value.

The positive neural network receives a nonnegative integer signal value from the positive coding device and performs arithmetic operations on the nonnegative integer.

The negative neural network receives a nonnegative integer signal value from the negative coding device and has the same circuit structure as the positive neural network.

The integer arithmetic operation output unit outputs a value obtained by subtracting the signal value output from the negative neural network from the signal value output from the positive neural network as an integer arithmetic operation result signal.

The feedback control device of the present invention comprises a control input reception unit, a positive feedback device, a negative feedback device, and an operation output unit, and has the following structure.

The control input reception unit receives a target value for the displacement of a control object, an observation value of the displacement, and an observation value of the differentiated displacement.

On the other hand, the positive and negative feedback devices each comprise:

(a) a nonnegative integer coding device A1 as described above;

(b) a nonnegative integer coding device A2 as described above;

(c) a nonnegative integer coding device A3 as described above;

(d) a control storing unit storing weights p, k1, k1, v1, and v2 and weight coefficients $\Delta q1$ and $\Delta q2$;

(e) a nonnegative integer coding device B1 as described above and receiving as a real number signal value a signal value pu obtained by multiplying a nonnegative integer signal value u output from the nonnegative integer coding device A1 by the stored weight p;

(f) a nonnegative integer coding device B2 as described above and receiving as real number signal values a signal value obtained by multiplying a nonnegative integer signal value output from the nonnegative integer coding device A1 by the stored weight k1 and a signal value obtained by multiplying a nonnegative integer signal value output from the nonnegative integer coding device A2 by the stored weight k2;

(g) a nonnegative integer coding device C as described above and receiving as real number signal values a signal value obtained by multiplying a nonnegative integer signal value output from the nonnegative integer coding device B1 by the stored weight v1 and a signal value obtained by multiplying a nonnegative integer signal value output from the nonnegative integer coding device B2 by the stored weight v2;

(h) a unilateral operation output unit outputting as an operation value a nonnegative integer signal value x output from the nonnegative integer coding device C; and (j) a control updating unit calculating:

$$\Delta q1 x^2 u + \Delta q2(x^2 u - 1)$$

using the nonnegative integer signal value u output from the nonnegative integer coding device A1 and nonnegative integer signal value x output from the nonnegative integer coding device C, and updating the weight p stored in the control storing unit by increasing it by the calculation result.

More specifically, the control input reception unit supplies:

(1) the target value for the displacement of the control object to the nonnegative integer coding device A1 of the positive feedback device as a real number signal value and "0" to the nonnegative integer coding device A1 of the negative feedback device as a real number signal value when the target value for the displacement of the control object is nonnegative;

(2) "0" to the nonnegative integer coding device A1 of the positive feedback device as a real number signal value and the target value for the displacement of the control object to the nonnegative integer coding device A1 of the negative feedback device as a real number signal value when the target value for the displacement of the control object is negative;

(3) the observation value of the displacement of the control object to the nonnegative integer coding device A2 of the positive feedback device as a real number signal value and "0" to the nonnegative integer coding device A2 of the negative feedback device as a real number signal value when the observation value of the displacement of the control object is nonnegative;

(4) "0" to the nonnegative integer coding device A2 of the positive feedback device as a real number signal value and the observation value of the displacement of the control object to the nonnegative integer coding device A2 of the negative feedback device as a real number signal value when the observation value of the displacement of the control object is negative;

(5) the observation value of the differentiated displacement of the control object to the nonnegative integer coding device A3 of the positive feedback device as a real number signal value and "0" to the nonnegative integer coding device A3 of the negative feedback device as a real number signal value when the observation value of the differentiated displacement of the control object is nonnegative; and (6) "0" to the nonnegative integer coding device A3 of the positive feedback device as a real number signal value and the observation value of the differentiated displacement of the control object to the nonnegative integer coding device A3 of the negative feedback device as a real number signal value when the observation value of the differentiated displacement of the control object is negative.

Then, the operation output unit supplies to the control object a value obtained by subtracting the operation value output from the negative feedback device from the operation value output from the positive feedback device as an operation output.

In the feedback control device of the present invention, the nonnegative integer coding devices B1, B2, and C each can store as the two threshold coefficients $\Delta \theta 1$ and $\Delta \theta 2$ constant values satisfying the relationships:

$$\Delta \theta 1 > 0 > \Delta \theta 2 \text{ and}$$

$$|\Delta \theta 1| > |\Delta \theta 2|$$

instead of storing "0".

In the feedback control device of the present invention, the observation object has K different target states and the K different target states each have a target value assigned thereto. The feedback control device further can comprise the K neuron devices described above and have the following structure.

The i-th neuron device is given a positive input signal value and the other neuron devices are given an input signal value "0" when the observation object targets the i-th target state in the combination of K neuron devices and positive and negative feedback devices.

The K neuron devices each have:

(1) a switching weight storage unit which stores switching weights r1, r2, r3, and r4 and switching weight coefficients $\Delta s1$ and $\Delta s1$ for the neuron device;

(2) a nonnegative integer coding device D1 as described above and receiving a signal value obtained by multiplying an output signal value y output from the neuron device by the stored weight r1 as a real number signal value; and (3) a nonnegative integer coding device D2 as described above and receiving a signal value obtained by multiplying an output signal value y output from the neuron device by the stored weight r2 as a real number signal value;

(4) a signal value obtained by multiplying a nonnegative integer signal value output from the nonnegative integer coding device D1 by the stored weight r3 and a signal value obtained by multiplying a nonnegative integer signal value output from the nonnegative integer coding device D2 by the stored weight r4 are supplied to a nonnegative integer coding device C as real number signal values;

(5) a switching control updating unit calculating:

$$\Delta s1 x^2 y + \Delta s2(x^2 y - 1)$$

using the output signal value y output from the neuron device and nonnegative integer signal value x output from the nonnegative integer coding device C, and updating the weight r1 stored in the control storing unit by increasing it by the calculation result is further provided.

In other words, when there are K states, K sets of weights r1, r2, r3, r4, $\Delta s1$, and $\Delta s2$ are prepared and individually updated.

In the feedback control device of the present invention, the nonnegative integer coding devices B1, B2, and C each can store as the two threshold coefficients $\Delta \theta 1$ and $\Delta \theta 2$ constant values satisfying the relationship:

$$\Delta \theta 1 > 0 > \Delta \theta 2$$

instead of storing "0."

Furthermore, in the feedback control device of the present invention, the nonnegative integer coding devices D1 and D2 each can store as the two threshold coefficients $\Delta \theta 1$ and $\Delta \theta 2$ constant values satisfying the relationships:

$$\Delta \theta 1 > 0 > \Delta \theta 2 \text{ and}$$

$$|\Delta \theta 1| > |\Delta \theta 2|$$

instead of storing "0."

The programs according to another aspect of the present invention allow a computer to function as the above neuron device, neural network device, nonnegative integer coding device, integer cluster device, and feedback control device.

The programs according to the present invention can be recorded on a computer-readable information recording medium such as a compact disk, flexible disk, hard disk, magneto-optical disk, digital video disk, magnetic disk, and semiconductor memory.

The programs can be distributed/sold via a computer communication network independently from the computers and digital signal processors on which the programs run. The above information recording medium can be distributed/sold independently from the computers and digital signal processors.

The present invention provides a neuron device, neural network device, nonnegative integer coding device, integer cluster device, and feedback control device in which variable neuron thresholds are used, the Hebb's rule is extended, and integer representation is manipulated in a neural network so as to be preferable for proper control, and a computer-readable information recording medium on which programs for realizing them on a computer are recorded.

Figure 1:
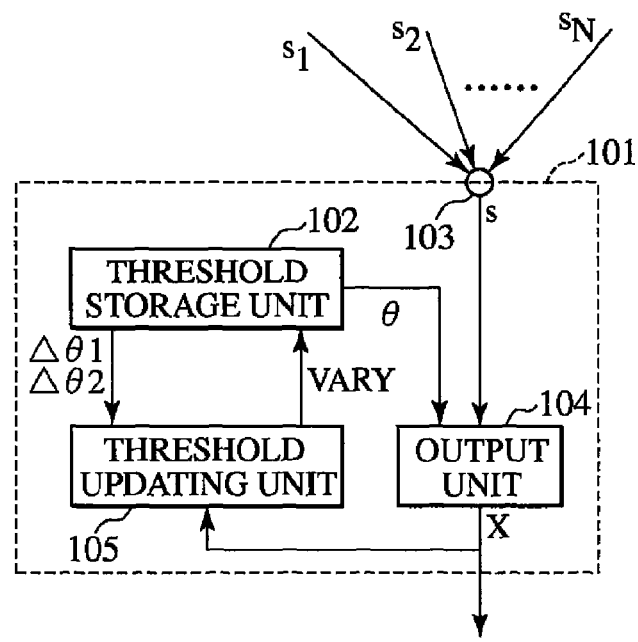
FIG. 1 is a pattern diagram showing the general structure of the neuron device.

LEGEND 101 neuron device
102 threshold storage unit
103 input reception unit
104 output unit
105 threshold updating unit
201 neural network device
202 weight storage unit
203 mediation input reception unit
204 weight updating unit
401 nonnegative integer coding device
402 nonnegative real number reception unit
403 nonnegative integer output unit
501 cluster
601 integer cluster device
602 real number reception unit
603 positive neural network
604 negative neural network
701 feedback control device 702 control input reception unit
703 positive feedback device
704 negative feedback device
705 operation output unit
801 manipulator
811 joint
812 joint
821 load
822 load

DETAILED DESCRIPTION OF THE INVENTION

Embodiments of the present invention will be described hereafter. The embodiments below are given for the purpose of explanation and do not confine the scope of the present invention. One of ordinary skill in the art may be able to utilize embodiments in which some or all elements are replaced with equivalent elements. Such embodiments fall under the scope of the present invention.

Particularly, the neuron device, neural network device, nonnegative integer coding device, integer cluster device, and feedback control device are all typically realized by running specific programs on a computer wherein the CPU (central processing unit) executes process control and various calculations and a RAM (random access memory) is used as memory for various storing.

However, the basic components mainly execute calculations such as four arithmetic operations and simple comparison and, therefore, can be configured by simple electronic circuits. Such electronic circuits can be realized as electronic elements or by applications of FPGA (field programmable gate array), DSP (digital signal processor), or ASIC (application specific integrated circuit).

Embodiment 1

The neuron device, neural network device, nonnegative integer coding device, integer cluster device, and feedback control device will be described in detail hereafter in that order.

(Neuron Device)

FIG. 1 is a pattern diagram showing the general structure of the neuron device according to this embodiment. An explanation is provided hereafter with reference to the drawing.

A neuron device 101 simulates a neural cell and comprises a threshold storage unit 102, an input reception unit 103, an output unit 104, and a threshold updating unit 105.

The threshold storage unit 102 stores a threshold variable $\theta$ and two threshold coefficients $\Delta\theta 1$ and $\Delta\theta 2$. The value of the variable $\theta$ at a time t is presented by $\theta(t)$ hereafter for easy understanding. The threshold storage unit 102 stores the latest value of the variable $\theta$.

The two threshold coefficients $\Delta\theta 1$ and $\Delta\theta 2$ can be adjusted by the user as appropriate. Typically, either one of the two relationships below is satisfied although this is not restrictive:

$$\Delta\theta 1 > 0 > \Delta\theta 2 \quad (1)$$

$$\Delta\theta 1 = \Delta\theta 2 = 0 \quad (2)$$

The input reception unit 103 receives one or multiple input signal values at predetermined time intervals. Since it receives at predetermined time intervals, the time can be presented by integers. Therefore, N input signal values at a time t are presented by $s_1(t), \ldots, s_N(t)$.

The output unit 104 outputs, as an output signal value, a value "1" for indicating that the neuron device 101 is firing when the sum total s of received input signal values is equal to or greater than the value of the stored threshold variable $\theta$, and otherwise a value "0" for indicating that the neuron device 101 is resting.

The value s(t) of the sum total s of input signal values at a time t can be presented by:

$$s(t) = \Sigma_{i=1}^{N} s_i(t).$$

The input signal values are generally nonnegative real number values although they are not restricted thereto.

Using a sigmoid function sgm(z) in which:

sgm(z)=1 (z>0);

sgm(z)=1 (z=0); and sgm(z)=0 (z<0), the output signal value X(t) at a time t is presented by:

$$X(t) = \text{sgm}(s(t) - \theta(t)).$$

Using the output signal value X and stored threshold coefficients $\Delta\theta 1$ and $\Delta\theta 2$, the threshold updating unit 105 calculates:

$$\Delta\theta 1 X + \Delta\theta 2 (X-1)$$

and updates the value of the threshold variable $\theta$ stored in the threshold storage unit 102 by increasing it by the calculation result.

More specifically, using the value $\theta(t)$ of the threshold variable $\theta$ at a time t, the value $\theta(t+1)$ of the threshold variable $\theta$ at a time t+1 is presented by:

$$\theta(t+1) = \theta(t) + \Delta\theta 1 X(t) + \Delta\theta 2 (X(t)-1).$$

The neuron device 101 is also called a variable threshold neuron (VTN). The VTN can have two states. The VTN is firing when X(t) is 1 and resting when X(t) is 0.

The threshold $\theta(t)$ varies by the threshold coefficients $\Delta\theta 1$ and $\Delta\theta 2$. The threshold $\theta$ is increased by $\Delta\theta 1$ when the VTN 101 is firing and increased by $\Delta\theta 2$ when the VTN 101 is resting.

In the case wherein the above relationship:

$$\Delta\theta 1 > 0 > \Delta\theta 2$$

is satisfied, the increased threshold $\theta$ makes the firing difficult to occur as the firing state continues. On the other hand, the decreased threshold $\theta$ makes the firing easy to occur as the resting state continues. Furthermore, the relationship:

$$|\Delta\theta 1| > |\Delta\theta 2|$$

is often satisfied.

In the case wherein the relationship:

$$\Delta\theta 1 = \Delta\theta 2 = 0$$

is satisfied, the threshold is constant.

(Neural Network Device)

Figure 2:
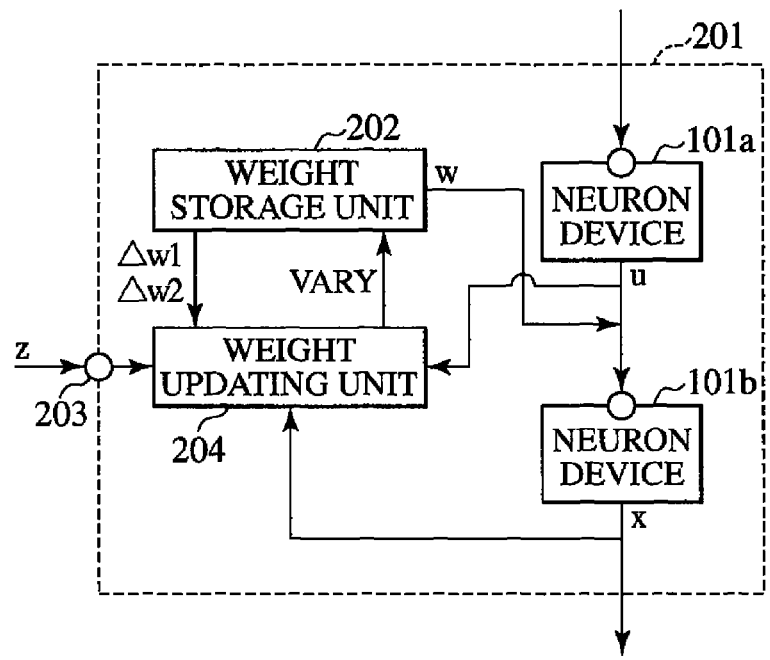
FIG. 2 is a pattern diagram showing the general structure of the neural network device.

FIG. 2 is a pattern diagram showing the general structure of the neural network device according to this embodiment. Explanation will be made hereafter with reference to the drawing.

A neural network device 201 shown in the drawing serves as an extended version of the Hebb's rule, which is a weighted update technique extensively used in neural networks.

The neural network device 201 comprises a weight storage unit 202, two neuron devices 101 (one is termed "the input neuron device 101a" and the other is termed "output neuron device 101b" hereafter), a mediation input reception unit 203, and a weight updating unit 204.

The weight storage unit 202 stores a weight w and two weight coefficients $\Delta w1$ and $\Delta w2$.

The mediation input reception unit 103 receives a mediation signal value z at time intervals of the input and output neuron devices 101a and 101b receiving input signal values and outputting output signal values. The mediation input reception unit 203 is generally connected to another neuron device 101.

A value wu obtained by multiplying the output signal value u from the input neuron device 101a by the stored weight w is given to the output neuron device 101b as an input signal value. In this drawing, an arrow accompanying the weight w indicates that the weight w serves as a multiplier (this applies hereafter).

Using the output signal value u from the input neuron device 101a, output signal value x from the output neuron device 101b, received mediation signal value z, and stored weight coefficients $\Delta w1$ and $\Delta w2$, the weight updating unit 204 calculates:

$$\Delta w1 xuz + \Delta w2(xuz-1)$$

and updates the weight w stored in the weight storage unit 202 by increasing it by the calculation result.

Including a time t, the weight is updated as follows:

$$w(t+1) = w(t) + \Delta w1 x(t)u(t)z(t) + \Delta w2(x(t)u(t)z(t)-1).$$

The weight coefficients often satisfy the following relationship:

$$\Delta w1 > 0 > \Delta w2,$$

particularly, $$|\Delta w1| > |\Delta w2|.$$

Figure 3A:
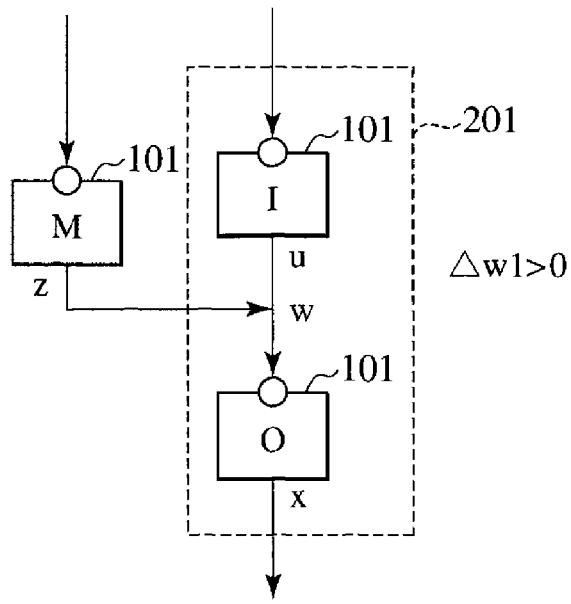
FIG. 3A is a pattern diagram for explaining the neuronal connection by the extended Hebb's rule.
Figure 3B:
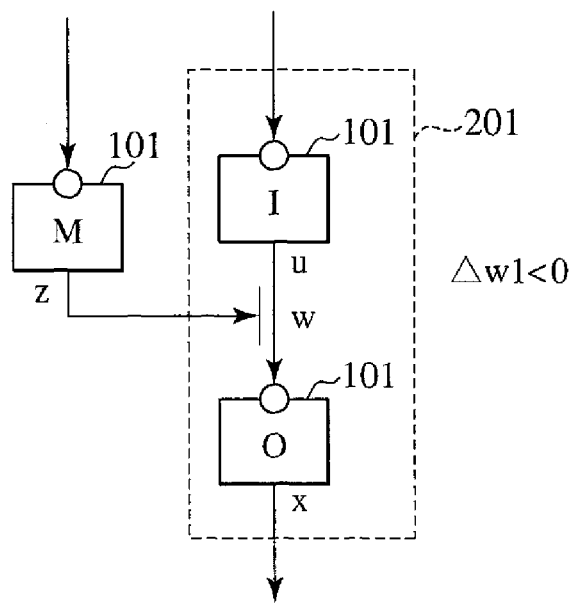
FIG. 3B is a pattern diagram for explaining the neuronal connection by the extended Hebb's rule.

FIGS. 3A and 3B are pattern diagrams for explaining the neuron connection according to the extended Hebb's rule of this embodiment. Explanation will be made hereafter with reference to the drawings.

Three neuron devices 101 (M), 101 (I), and 101 (O) shown in the drawings correspond to mediating, input, and output neuron devices, respectively. Their output values (states) are z, u, and x, respectively, and the connection weight is w.

The connection between the neuron devices 101 (I) and 101 (O) corresponds to the above described neural network device 201.

The weight coefficients $\Delta w1$ and $\Delta w2$ typically have opposite signs to each other.

When $\Delta w1 > 0$, the neuron device 101 (M) potentiates the connection between the neuron devices 101 (I) and 101 (O) (FIG. 3A).

On the other hand,

When $\Delta w1 < 0$, the neuron device 101 (M) inhibits the connection between the neuron devices 101 (I) and 101 (O) (FIG. 3B). The inhibition is presented by a bar at the tip of the arrow from the neuron device 101 (M) as a matter of principle.

Incidentally, when the neuron devices 101 (M) and 101 (I) coincides with each other or when the neuron devices 101 (M) and 101 (O) coincides with each other, it is the traditional Hebb's rule.

(Nonnegative Integer Coding Device)

Figure 4:
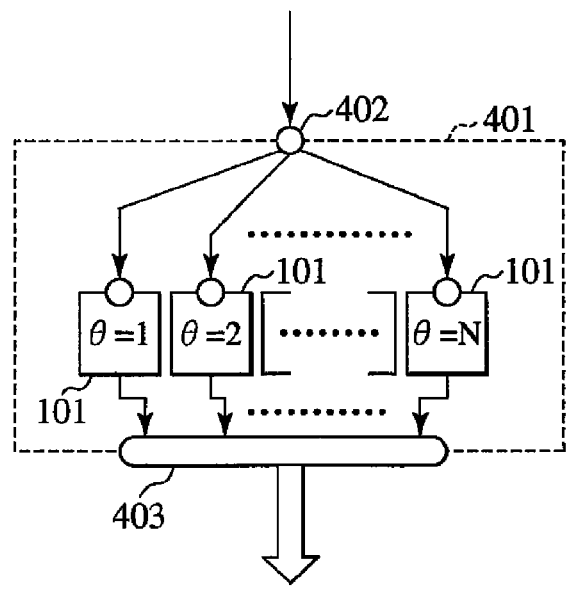
FIG. 4 is a pattern diagram showing the general structure of the nonnegative integer coding device.

FIG. 4 is a pattern diagram showing the general structure of the nonnegative integer coding device according to this embodiment. Explanation will be made hereafter with reference to the drawing.

A nonnegative integer coding device 401 according to another aspect of the present invention comprises N neuron devices 101 described above, a nonnegative real number reception unit 402, and a nonnegative integer output unit 403.

The nonnegative real number reception unit 402 receives one or multiple nonnegative real number signal values at time intervals of the N neuron devices 101 receiving input signal values and outputting output signal values, and outputs the sum total u of the nonnegative real number signal values to the N neuron devices 101 as an input signal value.

The nonnegative integer output unit 403 outputs the sum total of the output signal values from the N neuron devices 101 as a nonnegative integer signal value.

Furthermore, the N neuron devices 101 store 1, 2, ..., N as the initial value of the threshold variable $\theta$ and store "0" as the values of the threshold coefficients $\Delta\theta1$ and $\Delta\theta2$ in their threshold storage units 102. More specifically, the i-th neuron device 101 among the N neuron devices 101 has a threshold $\theta$ equal to a constant i.

When the outputs from the N neuron devices 101 are simply connected, the resultant value is an integer obtained by rounding off the decimal part of the real number value u.

As in the ordinary connection between neuron clusters, the complete connection can be made between neurons.

Figure 5A:
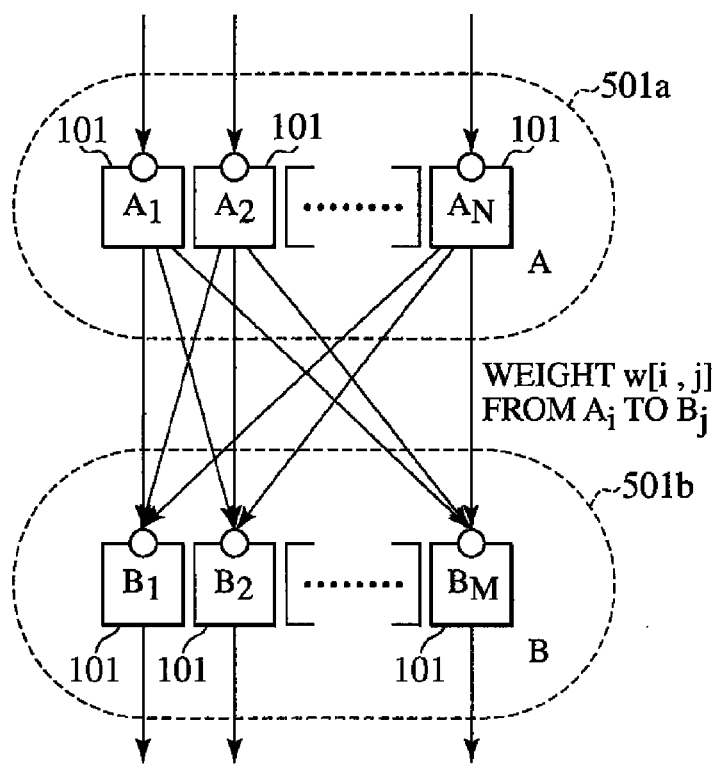
FIG. 5A is a pattern diagram showing the general neuron cluster connection including the nonnegative integer coding device.
Figure 5B:
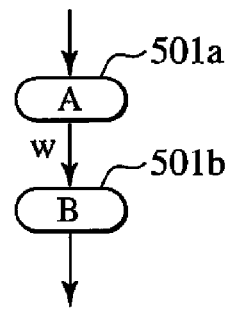
FIG. 5B is a pattern diagram showing the general neuron cluster connection including the nonnegative integer coding device.

FIGS. 5A and 5B are pattern diagrams showing the general neuron cluster connection including the nonnegative integer coding device 401.

As shown in FIG. 5A, two clusters 501a (A) and 501b (B) each have N neuron devices 101 as in the nonnegative integer coding device 401. The neuron devices 101 in the two clusters 501a (A) and 501b (B) are connected to each other. The i-th neuron device 101 (Ai) in the cluster 501a (A) and the j-th neuron device 101 (Bj) in the cluster 501b (B) are connected with a weight w[i,j]. w[i,j] corresponds to a two-dimensional matrix or two-dimensional array, in which all elements may have the same constant value or may be updated individually or collectively based on the above described extended Hebb's rule.

FIGS. 5A and 5B are simplified pattern diagrams. For easy understanding, the expression "the clusters 501a (A) and 501b (B) are connected with a weight w" is used. Such expression will be used hereafter as appropriate. For the connection shown in the drawings, the expression "the output of a cluster 501a (A) is multiplied by a weight w and given to a cluster 501b (B) as input" is used. When the phrase "multiplied by w" is referred to, w is generally a matrix/array as described above or a scalar in the case wherein all weights are equal.

(Integer Cluster Device)

Generally, the neuron device 101 outputs a value "0" or "1." It does not directly output a negative value. On the other hand, negative values should be treated while using the above nonnegative integer coding device 401. An integer cluster device realizing such a procedure will be described hereafter.

Figure 6:
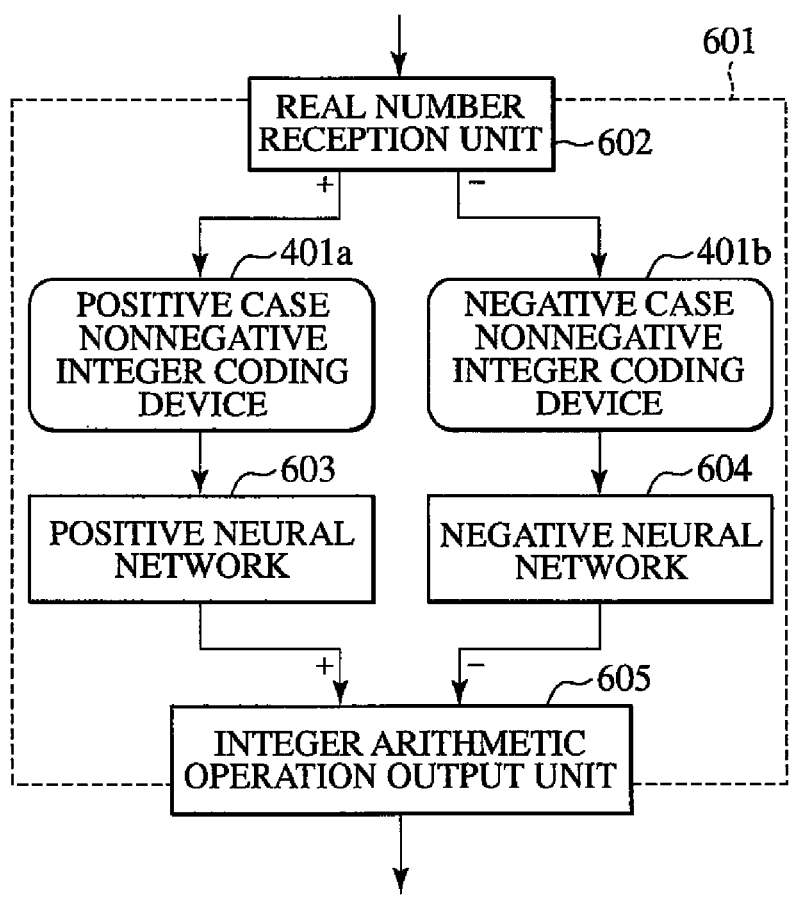
FIG. 6 is a pattern diagram showing the general structure of the integer cluster device.

FIG. 6 is a pattern diagram showing the general structure of the integer cluster device according to this embodiment. An explanation is provided hereafter with reference to the drawing.

An integer cluster device 601 comprises two nonnegative integer coding devices 401 described above (one is termed "the positive case nonnegative integer coding device 401a" and the other is termed "the negative case nonnegative integer coding device 401b" hereafter), a real number reception unit 602, a positive neural network 603, a negative neural network 604, and an integer arithmetic operation output unit 605.

The real number reception unit 602 receives one or multiple real number signal values at time intervals of the two nonnegative integer coding devices 401 receiving nonnegative real number signal values and outputting nonnegative integer signal values.

When the sum total v of the real number signal values is:

(a) nonnegative, the real number reception unit 602 supplies a real number value v to the positive case nonnegative integer cording device 401a as a nonnegative real number signal value and "0" to the negative case nonnegative integer coding device 401b as a nonnegative real number signal value, or (b) negative, the real number reception unit 602 supplies "0" to the positive case nonnegative integer coding device 401a as a nonnegative real number signal value and a real number value −v to the negative case nonnegative integer cording device 401b as a nonnegative real number signal value.

In this way, a positive signal value is given both to the positive case nonnegative integer coding device 401a and to the negative case nonnegative integer cording device 401b. The coding to nonnegative integers is achieved.

The positive neural network 603 and negative neural networks 604 have the same network structure although the weight may vary depending on the learning results.

The positive neural network 603 receives a nonnegative integer signal value from the positive case nonnegative integer coding device 401a and performs arithmetic operations on the nonnegative integer.

The negative neural network 604 receives a nonnegative integer signal value from the negative case nonnegative integer coding device 401b and performs arithmetic operations on the nonnegative integer.

Both the positive neural networks 603 and the negative neural networks 604 output a positive signal value (absolute value). Therefore, the integer arithmetic operation output unit 605 outputs a value obtained by subtracting the signal value output from the negative neural network 604 from the signal value output from the positive neural network 603 as an integer arithmetic operation result signal.

As described above, zero or a positive value is used for the procedure as it is and a negative value is converted to a positive value and then used for the procedure. At the end, the difference between the two results is obtained and used for the connection. In this way, general procedures for real numbers are available.

(Feedback Control Device)

An embodiment of the feedback control device using the above neuron device 101 and nonnegative integer coding device 401 and the principle of the neural network device 201 and integer cluster device 601 will be described hereafter.

Figure 7:
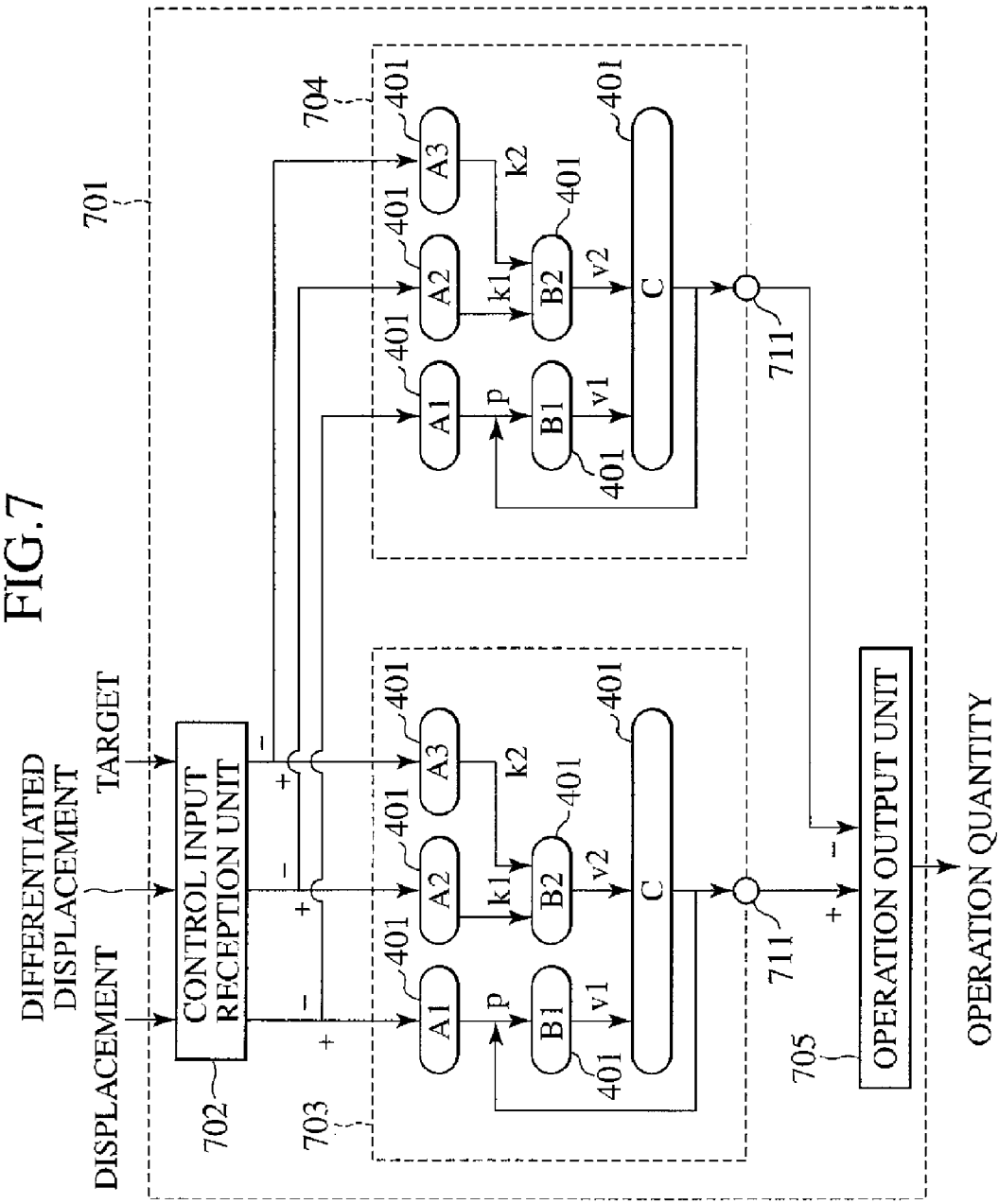
FIG. 7 is a pattern diagram showing the general structure of the feedback control device.

FIG. 7 is a pattern diagram showing the general structure of the feedback control device according to this embodiment. An explanation is provided hereafter with reference to the drawing.

A feedback control device 701 comprises a control input reception unit 702, a positive feedback device 703, a negative feedback device 704, and an operation output unit 705.

The control input reception unit 702 receives a target value for the displacement of a control object, an observation value of the displacement, and an observation value of the differentiated displacement.

Any combination of displacement and differentiated displacement can be used. Examples of such a combination include "position and speed," "angle and angular velocity," "speed and acceleration," and "angular velocity and angular acceleration."

The positive and negative feedback devices 703 and 704 have the same circuit structure. Therefore, the negative feedback device 704 is not shown in detail in the drawing for easy understanding.

The positive and negative feedback devices 703 and 704 each comprises six nonnegative integer coding devices 401 (A1, A2, A3, B1, B2, C), a control storing unit (not shown), and a control updating unit (not shown).

The control storing unit stores weights p, k1, k1, v1, and v2 and weight coefficients $\Delta q1$ and $\Delta q2$. This is the same as in the above devices.

The nonnegative integer coding device 401 (B1) receives as a real number signal value a signal value pu obtained by multiplying a nonnegative integer signal value u output from the nonnegative integer coding device 401 (A1) by the stored weight p. The nonnegative integer coding device 401 (B2) receives as real number signal values a signal value obtained by multiplying a nonnegative integer signal value output from the nonnegative integer coding device 401 (A1) by the stored weight k1 and a signal value obtained by multiplying a nonnegative integer signal value output from the nonnegative integer coding device 401 (A2) by the stored weight k2.

The nonnegative integer coding device 401 (C) receives as real number signal values a signal value obtained by multiplying a nonnegative integer signal value output from the nonnegative integer coding device 401 (B1) by the stored weight v1 and a signal value obtained by multiplying a nonnegative integer signal value output from the nonnegative integer coding device 401 (B2) by the stored weight v2.

A unilateral operation output unit 711 outputs as an operation value a nonnegative integer signal value x output from the nonnegative integer coding device 401 (C).

Using the nonnegative integer signal value u output from the nonnegative integer coding device 401 (A1) and nonnegative integer signal value x output from the nonnegative integer coding device 401 (C), the control updating unit calculates:

$$\Delta q1 x^2 u + \Delta q2(x^2 u - 1)$$

and updates the weight p stored in the control storing unit by increasing it by the calculation result. This is the same as in the above devices and the above extended Hebb's rule is applied to the connection between the nonnegative integer coding devices 401 (A1, B1).

The control input reception unit 702 properly sorts positive and negative values and accordingly supplies them to the positive and negative feedback devices 703 and 704 having the above structure in the same manner as in the integer cluster device 601. More specifically, the control input reception unit 702 supplies:

(1) the target value for the displacement of the control object to the nonnegative integer coding device 401 (A1) of the positive feedback device 703 as a real number signal value and "0" to the nonnegative integer coding device 401 (A1) of the negative feedback device 704 as a real number signal value when the target value for the displacement of the control object is nonnegative;

(2) "0" to the nonnegative integer coding device 401 (A1) of the positive feedback device 703 as a real number signal value and the target value for the displacement of the control object to the nonnegative integer coding device 401 (A1) of the negative feedback device 704 as a real number signal value when the target value for the displacement of the control object is negative;

(3) the observation value of the displacement of the control object to the nonnegative integer coding device 401 (A2) of the positive feedback device 703 as a real number signal value and "0" to the nonnegative integer coding device 401 (A2) of the negative feedback device 704 as a real number signal value when the observation value of the displacement of the control object is nonnegative;

(4) "0" to the nonnegative integer coding device 401 (A2) of the positive feedback device 703 as a real number signal value and the observation value of the displacement of the control object to the nonnegative integer coding device 401 (A2) of the negative feedback device 704 as a real number signal value when the observation value of the displacement of the control object is negative;

(5) the observation value of the differentiated displacement of the control object to the nonnegative integer coding device 401 (A3) of the positive feedback device 703 as a real number signal value and "0" to the nonnegative integer coding device 401 (A3) of the negative feedback device 704 as a real number signal value when the observation value of the differentiated displacement of the control object is nonnegative; and (6) "0" to the nonnegative integer coding device 401 (A3) of the positive feedback device 703 as a real number signal value and the observation value of the differentiated displacement of the control object to the nonnegative integer coding device 401 (A3) of the negative feedback device 704 as a real number signal value when the observation value of the differentiated displacement of the control object is negative.

On the other hand, the operation output unit 705 supplies to the control object a value obtained by subtracting the operation value output from the negative feedback device 704 from the operation value output from the positive feedback device 703 as an operation output in order to utilize the difference between the positive and negative cases as in the above integer cluster device 601.

In the positive and negative feedback devices 703 and 704 of this embodiments, the nonnegative integer coding devices 401 (B1, B2, C) each typically store as the two threshold coefficients $\Delta\theta1$ and $\Delta\theta2$ constant values satisfying the relationships:

$$\Delta\theta1 > 0 > \Delta\theta2 \text{ and}$$

$$|\Delta\theta1| > |\Delta\theta2|$$

instead of storing "0."

On the other hand, the nonnegative integer coding devices 401 (A1, A2, A3) typically store:

$$\Delta\theta1 = \Delta\theta2 = 0$$

for simply yielding integers.

In addition, in consideration of the learning process according to the extended Hebb's rule, constant values satisfying the relationships:

$$\Delta q1 > 0 > \Delta q2 \text{ and}$$

$$|\Delta q1| > |\Delta q2|$$

are often used.

Figure 8:
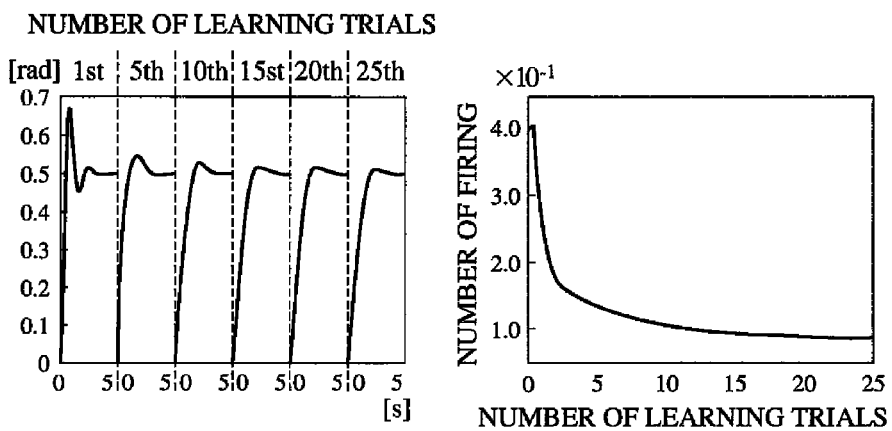
FIG. 8 includes graphical representations showing the results of learning simulation in which the feedback control device according to the embodiment is applied to servomotor control.

FIG. 8 includes graphical representations showing the results of learning simulation in which the feedback control device according to this embodiment is applied to servomotor control. An explanation is provided hereafter with reference to the drawing.

In this simulation, the angle of a servomotor is targeted. The current angle and angular velocity are observed and the voltage applied to the servomotor is obtained as the operation output. The servomotor can be assumed to be a simple secondary system. The feedback control device serves as a variable PD controller.

The nonnegative integer coding device 401 consists of 50 neuron devices 101. The desired angle is set for 0.5 rad.

The left drawing shows the angle in every five seconds ("rad" on the ordinate) in the 1st, 5th, 10th, 15th, 20th, and 25th runs of trial learning. As seen in the drawing, deviation before reaching the target value becomes smaller and the control performance is gradually improved as the trial is repeated. The control error is calculated by the nonnegative integer coding device 401 (B2) as the difference between the target value and current angle. The learning process is supervised from this viewpoint.

Here, it is noted that the error is not included in changes in the network itself. The weight and threshold are updated according to predetermined rules and irrelevant to the error.

As shown in the right drawing, the number of firing VTNs is rapidly decreased as the number of runs of trial learning increases. The system has reached a desired control level when the number of firing VTNs becomes constant.

The number of firing neuron devices 101 after the system has reached a desired control level can be changed/adjusted by the values of $\Delta\theta1$, $\Delta\theta2$, $\Delta q1$, and $\Delta q2$. Here, it is known from experiments that desirable learning is achieved when the increasing elements $\Delta\theta1$ and $\Delta q1$ are significantly larger in absolute value than the decreasing elements $\Delta\theta2$ and $\Delta q2$.

Embodiment 2

In addition to the above structure of the embodiment, a target state is taken into account in this embodiment.

Figure 9:
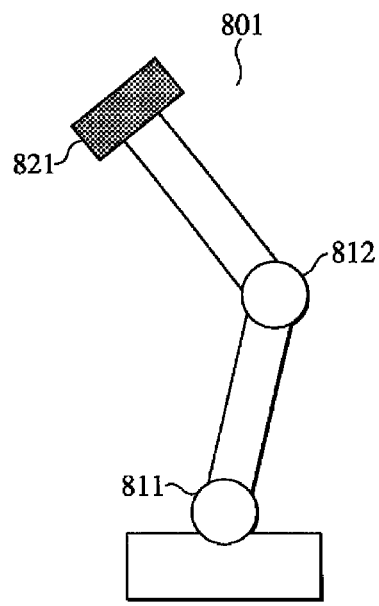
FIG. 9 is a pattern diagram showing the general structure of a manipulator that is a control object.

For example, the control of a manipulator shown in FIG. 9 will be discussed. An explanation is provided hereafter with reference to the drawing.

A manipulator 801 has two joints 811 and 812 for connecting the arms. A load 821 is placed at the end of an arm. The manipulator 801 is stable when the vertical line extending through its gravity center passes through the joint 811.

The joint 811 is set for any angle. Then, as shown in FIGS. 10A and 10B, the joint 812 of the manipulator 801 is set for two different angles.

Figure 10A:
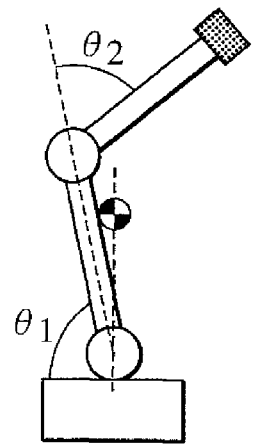
FIG. 10A is an illustration for explaining the posture of the manipulator receiving a different load.

FIG. 10A shows a first posture in which the angle of the joint 812 is set for supporting the load 821 of a first weight.

Figure 10B:
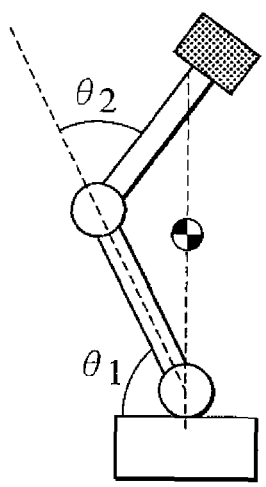
FIG. 10B is an illustration for explaining the posture of the manipulator receiving a different load

FIG. 10B shows a second posture in which the angle of the joint 812 is set for supporting the load 821 of a second weight.

Because the two loads 821 and 822 have different weights, the angle of the joint 812 is generally different between in the first posture and in the second posture. The angle of the joint 811 is automatically determined from the above condition for stability. Therefore, there is no need of explicitly giving it.

In this way, multiple postures the manipulator should go through in a series of movements are specified with some degree of freedom and control signals indicating what number of posture the manipulator is about to take in the series of movements are supplied to the feedback control device 701.

Figure 11:
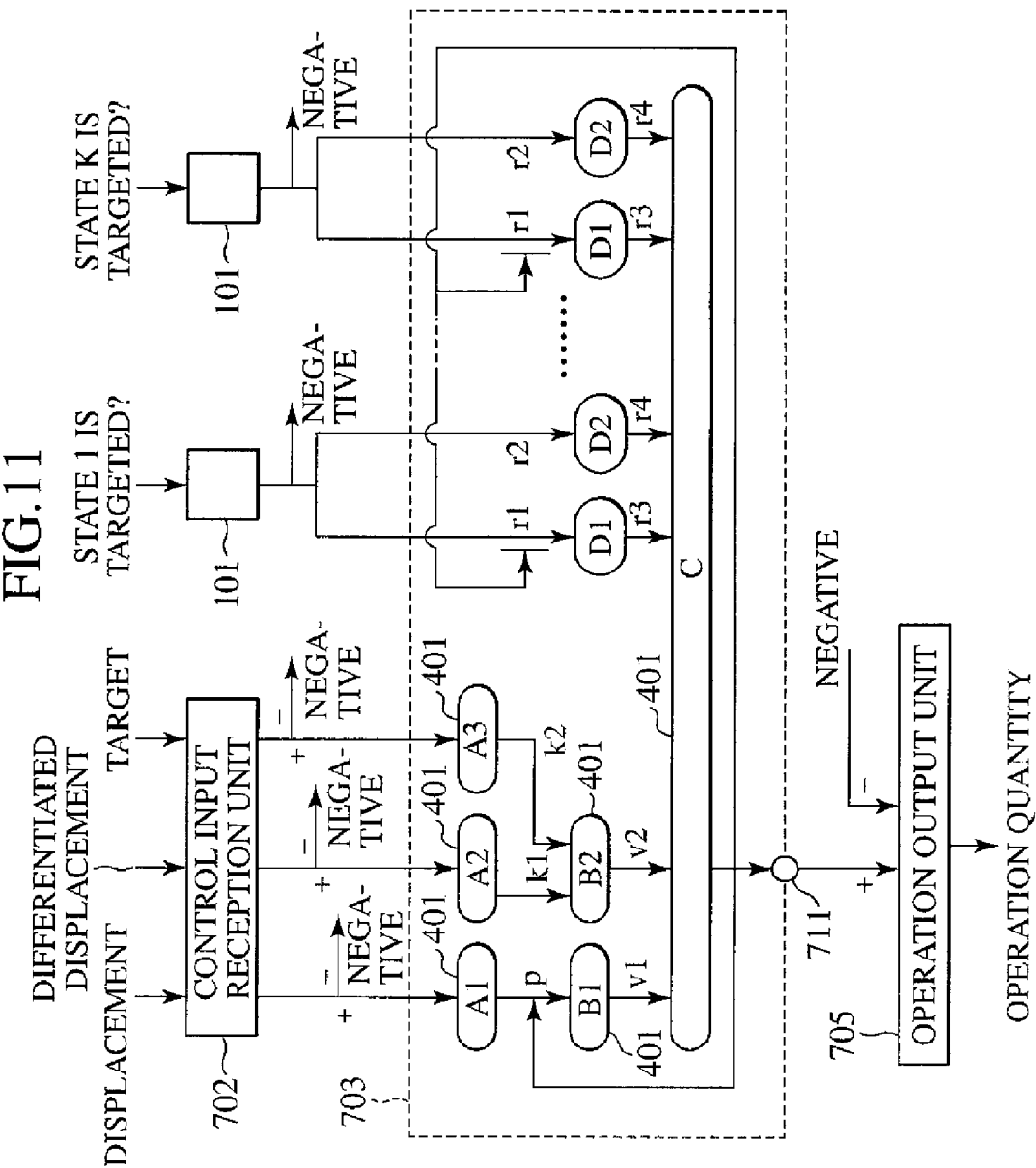
FIG. 11 is a pattern diagram showing the general structure of the feedback control device using signals indicating the number of the target state being targeted.

FIG. 11 is a pattern diagram showing the general structure of the feedback control device using signals indicating what number of state is targeted. An explanation is provided hereafter with reference to the drawing.

The feedback control device 701 of this embodiment shares some configuration with the above described feedback control device 701; therefore, the drawing is simplified where appropriate. The positive part and negative part have the same configuration; therefore, the negative part is simplified where appropriate.

In the feedback control device 701, the observation object has K different target states and the K different target states each have a target value assigned thereto. The above manipulator 801 takes two different postures; therefore, K=2.

K neuron devices 101 are further provided. Among the K neuron devices 101, the i-th neuron device 101 is given a positive input signal value and the other neuron devices 101 are given an input signal value "0" when the observation object is targeting the i-th target state.

In the positive and negative feedback devices 703 and 704, connected to each of the K neuron devices 101 are:

(1) a switching weight storage unit (not shown) storing switching weights r1, r2, r3, and r4 and switching weight coefficients $\Delta s1$ and $\Delta s2$ for the neuron device 101;

(2) a nonnegative integer coding device 401 (D1) as described above and receiving a signal value obtained by multiplying an output signal value y output from the neuron device 101 by the stored weight r1 as a real number signal value; and (3) a nonnegative integer coding device 401 (D2) as described above and receiving a signal value obtained by multiplying an output signal value y output from the neuron device 101 by the stored weight r2 as a real number signal value;

(4) a signal value obtained by multiplying a nonnegative integer signal value output from the nonnegative integer coding device 401 (D1) by the stored weight r3 and a signal value obtained by multiplying a nonnegative integer signal value output from the nonnegative integer coding device 401 (D2) by the stored weight r4 are supplied to the nonnegative integer coding device 401 (C) as real number signal values;

(5) a switching control updating unit (not shown) calculating:

$$\Delta s1 x^2 y + \Delta s2 (x^2 y - 1)$$

using the output signal value y output from the neuron device 101 and nonnegative integer signal value x output from the nonnegative integer coding device 401 (C), and updating the weight r1 stored in the control storing unit by increasing it by the calculation result is connected.

In this embodiment, $\Delta s1 < 0$ for inhibition.

The nonnegative integer coding devices 401 (D1, D2) of the feedback control device 701 of the present invention each typically store as the two threshold coefficients $\Delta \theta 1$ and $\Delta \theta 2$ constant values satisfying the relationships:

$$\Delta \theta 1 > 0 > \Delta \theta 2 \text{ and}$$

$$|\Delta \theta 1| > |\Delta \theta 2|$$

instead of storing "0."

A non-zero input is given to the neuron device 101 corresponding to the subsequent posture in the order of target postures only during the transition to that posture and an input "0" is given to the other neuron devices 101.

The currently targeted posture has been learned based on the extended Hebb's rule. For example, for realizing the walking movement of a robot, the walking movement is divided into several phases. Using the breakpoints between the phases as the above "targeted postures," the walking movement can easily be designed and the phases can be learned. In this way, it is expected to reduce the workload for adjusting various parameters.

Furthermore, the joints can be divided into two groups; those to which target trajectories are given in advance (the above joint 812) and those of which the trajectories are determined through the learning process (the above joint 811). In this way, a neural network enabling walking while balancing can be acquired in a short time.

In the case wherein there are only two states as shown in FIGS. 10A and 10B, it is the second target state if not the first state. Therefore, only one neuron device 101 receiving a target state is necessary.

Figure 12:
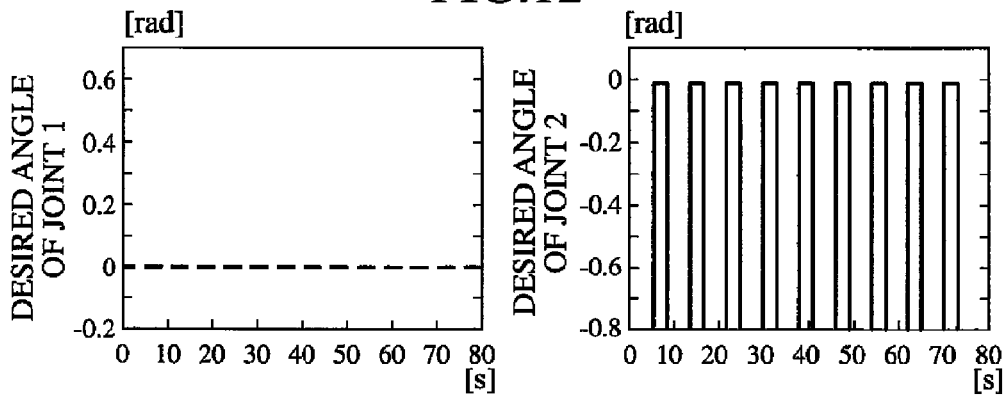
FIG. 12 includes graphical representations showing how target values are given in simulation.

FIG. 12 includes graphical representations showing how target values are given in the above simulation case. The left drawing shows the target angle of the joint 811 (Desired Angle of Joint 1 on the ordinate) in relation to time (on the abscissa). The right drawing shows the target angle of the joint 812 (Desired Angle of Joint 2 on the ordinate) in relation to time (on the abscissa).

As shown in the drawing, the time for the first posture and the time for the second posture are switched at predetermined intervals.

Figure 13:
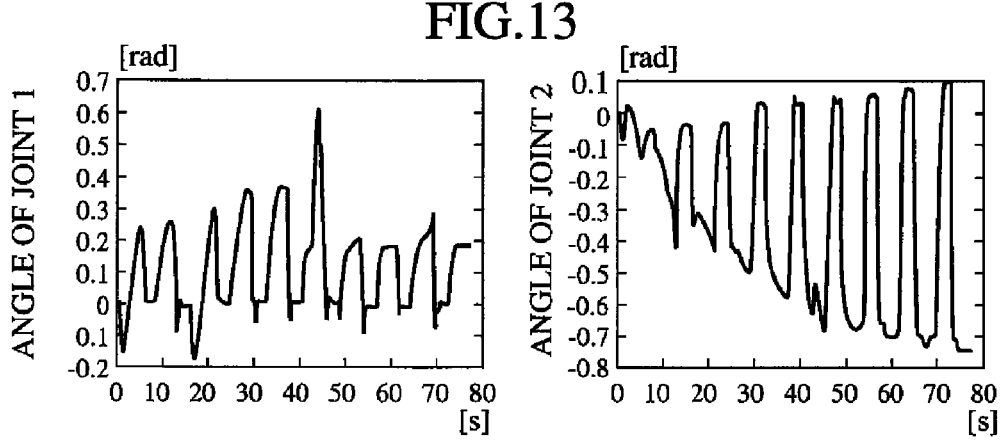
FIG. 13 includes graphical representations showing the experimental learning results using the target values shown in FIG. 12.

FIG. 13 includes graphical representations showing the results of experimental learning using the target values shown in FIG. 12.

The left drawing shows the angle of the joint 811 (Angle of Joint 1 on the ordinate) in relation to time (on the abscissa). The right drawing shows the angle of the joint 812 (Angle of Joint 2 on the ordinate) in relation to time (on the abscissa). As shown in the drawing, the posture is restored to a stable posture with time.

Figure 14:
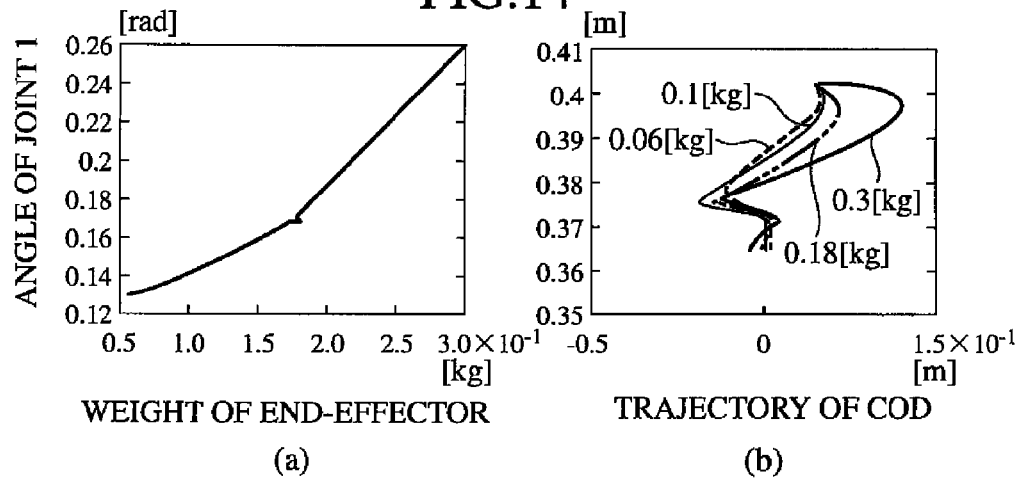
FIG. 14 includes graphical representations showing the convergence value of the posture upon reception of different loads.

FIG. 14 includes graphical representations showing the convergence value of the posture when loads of different weights are placed.

The left drawing shows the convergence value of the angle of the joint 811 (Angle of Joint 1 on the ordinate) in relation to the load weight (Weight on the abscissa). The right drawing shows the trajectories of the gravity center (Trajectory of COG) starting with different initial postures for different weights. Although the joint 811 goes through different angles, it is stored to the same convergence point, which is the optimum movement for the robot.

The present application claims the priority for the basic application, Japanese Patent Application No. 2007-257123, filed on Oct. 1, 2007 and the content of the basic application is incorporated herein to the extent that the law of the designated country allows.

INDUSTRIAL APPLICABILITY

The present invention provides a neuron device, neural network device, nonnegative integer coding device, integer cluster device, and feedback control device in which variable neuron thresholds are used, the Hebb's rule is extended, and integer representation is manipulated in a neural network so as to be preferable for proper controls, and a computer-readable information recording medium on which programs for realizing them on a computer are recorded.

The invention claimed is:

1. An integer cluster device comprising:
a processor;
a positive coding device and a negative coding device;
a real number reception unit that operates on the processor for receiving one or multiple real number signal values at time intervals of said positive coding device and said negative coding device receiving nonnegative real number signal values and outputting nonnegative integer signal values, and supplying:
(a) a real number value v to said positive coding device as a nonnegative real number signal value and "0" to said negative coding device as a nonnegative real number signal value when the sum total v of the real number signal values is nonnegative; and
(b) "0" to said positive coding device as a nonnegative real number signal value and a real number value −v to said negative coding device as a nonnegative real number signal value when the sum total v of the real number signal values is negative;
a positive neural network receiving a nonnegative integer signal value from said positive coding device and performing arithmetic operations on the nonnegative integer;

a negative neural network receiving a nonnegative integer signal value from said negative coding device and having the same circuit structure as said positive neural network; and an integer arithmetic operation output unit that operates on the processor for outputting as an integer arithmetic operation result signal a value obtained by subtracting the signal value output from said negative neural network from the signal value output from said positive neural network, wherein each of the positive coding device and the negative coding device comprises:

N neuron devices;

a nonnegative real number reception unit that operates on the processor for receiving one or multiple nonnegative real number signal values at time intervals of said N neuron devices receiving input signal values and outputting output signal values, and outputting the sum total u of the nonnegative real number signal values to said N neuron devices as an input signal value; and a nonnegative integer output unit that operates on the processor for outputting the sum total of the output signal values from said N neuron devices as a nonnegative integer signal value, wherein each of said N neuron devices comprises:

a threshold storage unit that operates on the processor for storing a threshold variable θ and two threshold coefficients $\Delta\theta 1$ and $\Delta\theta 2$;

an input reception unit that operates on the processor for receiving one or multiple input signal values at predetermined time intervals;

an output unit that operates on the processor for outputting, as an output signal value, a value "1" for indicating that the neuron device is firing when the sum total s of received input signal values is equal to or greater than the value of said stored threshold variable θ, and otherwise a value "0" for indicating that the neuron device is resting; and a threshold updating unit that operates on the processor for calculating:

$$\Delta\theta 1 X + \Delta\theta 2(X-1); \text{ and}$$

using said output signal value X and said stored threshold coefficients $\Delta\theta 1$ and $\Delta\theta 2$, and updating the value of the threshold variable θ stored in said threshold storage unit by increasing the threshold variable θ by the calculation result, and wherein said N neuron devices store 1, 2, ..., N as the initial value of the threshold variable θ and store "0" as the values of the threshold coefficients $\Delta\theta 1$ and $\Delta\theta 2$ in their threshold storage units.

2. A feedback control device comprising:

a processor;

a control input reception unit that operates on the processor for receiving a target value for the displacement of a control object, an observation value of the displacement, and an observation value of the differentiated displacement;

a positive feedback device; and a negative feedback device, wherein each of the positive feedback device and negative feedback device comprises:

(a) a first nonnegative integer coding device;
(b) a second nonnegative integer coding device;
(c) a third nonnegative integer coding device;
(d) a control storing unit that operates on the processor for storing weights p, k1, k2, v1, and v2 and weight coefficients $\Delta q1$ and $\Delta q2$;
(e) a fourth nonnegative integer coding device receiving as a real number signal value a signal value pu obtained by multiplying a nonnegative integer signal value u output from said first nonnegative integer coding device by said stored weight p;
(f) a fifth nonnegative integer coding device receiving as real number signal values a signal value obtained by multiplying a nonnegative integer signal value output from said first nonnegative integer coding device by said stored weight k1 and a signal value obtained by multiplying a nonnegative integer signal value output from said second nonnegative integer coding device by said stored weight k2;
(g) a sixth nonnegative integer coding device receiving as real number signal values a signal value obtained by multiplying a nonnegative integer signal value output from said fourth nonnegative integer coding device by said stored weight v1 and a signal value obtained by multiplying a nonnegative integer signal value output from said fifth nonnegative integer coding device by said stored weight v2;
(h) a unilateral operation output unit that operates on the processor for outputting as an operation value a nonnegative integer signal value x output from said sixth nonnegative integer coding device; and
(i) a control updating unit that operates on the processor for calculating:

$$\Delta q1 x^2 u + \Delta q2(x^2 u - 1)$$

using the nonnegative integer signal value u output from said first nonnegative integer coding device and nonnegative integer signal value x output from said sixth nonnegative integer coding device, and updating the weight p stored in said control storing unit by increasing it by the calculation result;

wherein said control input reception unit operates on the processor for supplying:

(1) the target value for the displacement of the control object to the first nonnegative integer coding device of the positive feedback device as a real number signal value and "0" to the first nonnegative integer coding device of the negative feedback device as a real number signal value when the target value for the displacement of the control object is nonnegative;

(2) "0" to the first nonnegative integer coding device of the positive feedback device as a real number signal value and the target value for the displacement of the control object to the first nonnegative integer coding device of the negative feedback device as a real number signal value when the target value for the displacement of the control object is negative;

(3) the observation value of the displacement of the control object to the second nonnegative integer coding device of the positive feedback device as a real number signal value and "0" to the second nonnegative integer coding device of the negative feedback device as a real number signal value when the observation value of the displacement of the control object is nonnegative;

(4) "0" to the second nonnegative integer coding device of the positive feedback device as a real number signal value and the observation value of the displacement of the control object to the second nonnegative integer coding device of the negative feedback device as a real number signal value when the observation value of the displacement of the control object is negative;

(5) the observation value of the differentiated displacement of the control object to the third nonnegative integer coding device of the positive feedback device as a real number signal value and "0" to the third nonnegative integer coding device of the negative feedback device as a real number signal value when the observation value of the differentiated displacement of the control object is nonnegative; and (6) "0" to the third nonnegative integer coding device of the positive feedback device as a real number signal value and the observation value of the differentiated displacement of the control object to the third nonnegative integer coding device of the negative feedback device as a real number signal value when the observation value of the differentiated displacement of the control object is negative, wherein said feedback control device further comprises:

an operation output unit that operates on the processor for outputting to the control object a value obtained by subtracting the operation value output from the negative feedback device from the operation value output from the positive feedback device as an operation output, and wherein each of the first, second, third, fourth, fifth and sixth nonnegative integer coding devices comprises:

N neuron devices;

a nonnegative real number reception unit that operates on the processor for receiving one or multiple nonnegative real number signal values at time intervals of said N neuron devices receiving input signal values and outputting output signal values, and outputting the sum total u of the nonnegative real number signal values to said N neuron devices as an input signal value; and a nonnegative integer output unit that operates on the processor for outputting the sum total of the output signal values from said N neuron devices as a nonnegative integer signal value, wherein each of said N neuron devices comprises:

a threshold storage unit that operates on the processor for storing a threshold variable $\theta$ and two threshold coefficients $\Delta\theta1$ and $\Delta\theta2$;

an input reception unit that operates on the processor for receiving one or multiple input signal values at predetermined time intervals;

an output unit that operates on the processor for outputting, as an output signal value, a value "1" for indicating that the neuron device is firing when the sum total s of received input signal values is equal to or greater than the value of said stored threshold variable $\theta$, and otherwise a value "0" for indicating that the neuron device is resting; and a threshold updating unit that operates on the processor for calculating:

$\Delta\theta1X\Delta\theta2(X-1)$ using said output signal value X and said stored threshold coefficients $\Delta\theta1$ and $\Delta\theta2$, and updating the value of the threshold variable $\theta$ stored in said threshold storage unit by increasing the threshold variable $\theta$ by the calculation result.

3. The feedback control device according to claim 2, wherein the observation object has K different target states and the K different target states each have a target value assigned thereto, wherein said feedback control device further comprises K neuron devices, wherein the i-th neuron device is given a positive input signal value and the other neuron devices are given an input signal value "0" when the observation object is targeting the i-th target state in the combination of said K neuron devices, positive feedback device and negative feedback device, wherein said feedback control device for each of said K neuron devices:

(1) a switching weight storage unit that operates on the processor for storing switching weights r1, r2, r3, and r4 and switching weight coefficients $\Delta$s1 and $\Delta$s1 for the neuron device (101);

(2) a seventh nonnegative integer coding device receiving a signal value obtained by multiplying an output signal value y output from the neuron device by the stored weight r1 as a real number signal value; and (3) an eighth nonnegative integer coding device receiving a signal value obtained by multiplying an output signal value y output from the neuron device by the stored weight r2 as a real number signal value;

(4) a signal value obtained by multiplying a nonnegative integer signal value output from the seventh nonnegative integer coding device by the stored weight r3 and a signal value obtained by multiplying a nonnegative integer signal value output from the eighth nonnegative integer coding device by the stored weight r4 are supplied to said sixth nonnegative integer coding device as real number signal values;

(5) a switching control updating unit that operates on the processor for calculating:

$\Delta s1 x^2 y + \Delta s2(x^2 y - 1)$ using the output signal value y output from the neuron device and nonnegative integer signal value x output from said sixth nonnegative integer coding device, and updating the weight r1 stored in said control storing unit by increasing it by the calculation result is further provided, wherein each of said K neuron devices comprises:

a threshold storage unit that operates on the processor for storing a threshold variable 8 and two threshold coefficients $\Delta\theta1$ and $\Delta\theta2$;

an input reception unit that operates on the processor for receiving one or multiple input signal values at a predetermined time intervals;

an output unit that operates on the processor for outputting, as an output signal value, a value "1" for indicating that the neuron device is firing when the sum total s of received input signal values is equal to or greater than the value of the stored threshold variable $\theta$, and otherwise a value "0" for indicating that the neuron device is resting; and a threshold updating unit that operates on the processor for calculating:

$\Delta\theta1X + \Delta\theta2(X-1)$ using said output signal value X and said stored threshold coefficients $\Delta\theta1$ and $\Delta\theta2$, and updating the value of the threshold $\theta$ stored in said threshold storage unit by increasing the threshold value $\theta$ by the calculation result so as to simulate a neural network.

4. The feedback control device according to claim 3, wherein each of said fourth, fifth and sixth nonnegative integer coding devices store as the two threshold coefficients $\Delta\theta1$ and $\Delta\theta2$ constant values satisfying the relationship:

$\Delta\theta1 > 0 > \Delta\theta2$ instead of storing "0".

5. The feedback control device according to claim 4, wherein each of said seventh and eighth nonnegative integer coding devices store as the two threshold coefficients Δθ1 and Δθ2 constant values satisfying the relationships:

$$\Delta\theta1 > 0 > \Delta\theta2 \text{ and}$$

$$|\Delta\theta1| > |\Delta\theta2|$$

instead of storing "0."

6. A computer program product comprising:
a computer program that operates on a processor of an integer cluster device;
a non-transitory computer-readable storage medium having the computer program tangibly embodied thereon, wherein the integer cluster device comprises:
a positive coding device and a negative coding device;
a real number reception unit that operates on the processor for receiving one or multiple real number signal values at time intervals of said positive coding device and said negative coding device receiving nonnegative real number signal values and outputting nonnegative integer signal values, and supplying:
(a) a real number value v to said positive coding device as a nonnegative real number signal value and "0" to said negative coding device as a nonnegative real number signal value when the sum total v of the real number signal values is nonnegative; and
(b) "0" to said positive coding device as a nonnegative real number signal value and a real number value −v to said negative coding device as a nonnegative real number signal value when the sum total v of the real number signal values is negative;
a positive neural network receiving a nonnegative integer signal value from said positive coding device and performing arithmetic operations on the nonnegative integer;
a negative neural network receiving a nonnegative integer signal value from said negative coding device and having the same circuit structure as said positive neural network; and
an integer arithmetic operation output unit that operates on the processor for outputting as an integer arithmetic operation result signal a value obtained by subtracting the signal value output from said negative neural network from the signal value output from said positive neural network, and
wherein each of the positive coding device and the negative coding device comprises:
N neuron devices;
a nonnegative real number reception unit that operates on the processor for receiving one or multiple nonnegative real number signal values at time intervals of said N neuron devices receiving input signal values and outputting output signal values, and outputting the sum total u of the nonnegative real number signal values to said N neuron devices as an input signal value; and
a nonnegative integer output unit that operates on the processor for outputting the sum total of the output signal values from said N neuron devices as a nonnegative integer signal value,
wherein each of said N neuron devices comprises:
a threshold storage unit that operates on the processor for storing a threshold variable θ and two threshold coefficients Δθ1 and Δθ2;
an input reception unit that operates on the processor for receiving one or multiple input signal values at predetermined time intervals;
an output unit that operates on the processor for outputting, as an output signal value, a value "1" for indicating that the neuron device is firing when the sum total s of received input signal values is equal to or greater than the value of said stored threshold variable θ, and otherwise a value "0" for indicating that the neuron device is resting; and
a threshold updating unit that operates on the processor for calculating:

$$\Delta\theta1 X + \Delta\theta2(X-1); \text{ and}$$

using said output signal value X and said stored threshold coefficients Δθ1 and Δθ2, and updating the value of the threshold variable θ stored in said threshold storage unit by increasing the threshold variable θ by the calculation result, and wherein said N neuron devices store 1, 2, . . . , N as the initial value of the threshold variable θ and store "0" as the values of the threshold coefficients Δθ1 and Δθ2 in their threshold storage units.

7. A computer program product comprising:
a computer program that operates on a processor of a feedback control device;
a non-transitory computer-readable storage medium having the computer program tangibly embodied thereon, wherein the feedback control device comprises:
a control input reception unit that operates on the processor for receiving a target value for the displacement of a control object, an observation value of the displacement, and an observation value of the differentiated displacement;
a positive feedback device; and
a negative feedback device,
wherein each of the positive feedback device and negative feedback device comprises:
(a) a first nonnegative integer coding device;
(b) a second nonnegative integer coding device;
(c) a third nonnegative integer coding device;
(d) a control storing unit that operates on the processor for storing weights p, k1, k2, v1, and v2 and weight coefficients Δq1 and Δq2;
(e) a nonnegative integer coding device "B1" receiving as a real number signal value a signal value pu obtained by multiplying a nonnegative integer signal value u output from said first nonnegative integer coding device by said stored weight p;
(f) a nonnegative integer coding device "B2" receiving as real number signal values a signal value obtained by multiplying a nonnegative integer signal value output from said first nonnegative integer coding device by said stored weight k1 and a signal value obtained by multiplying a nonnegative integer signal value output from said second nonnegative integer coding device by said stored weight k2;
(g) a nonnegative integer coding device "C" receiving as real number signal values a signal value obtained by multiplying a nonnegative integer signal value output from said nonnegative integer coding device "B1" by said stored weight v1 and a signal value obtained by multiplying a nonnegative integer signal value output from said nonnegative integer coding device "B2" by said stored weight v2;
(h) a unilateral operation output unit that operates on the processor for outputting as an operation value a nonnegative integer signal value x output from said nonnegative integer coding device "C"; and
(i) a control updating unit that operates on the processor for calculating:

$$\Delta q1 x^2 u + \Delta q2(x^2 u - 1)$$

using the nonnegative integer signal value u output from said first nonnegative integer coding device and nonnegative integer signal value x output from said nonnegative integer coding device C, and updating the weight p stored in said control storing unit by increasing it by the calculation result;
wherein said control input reception unit operates on the processor for supplying:
(1) the target value for the displacement of the control object to the first nonnegative integer coding device of the positive feedback device as a real number signal value and "0" to the first nonnegative integer coding device of the negative feedback device as a real number signal value when the target value for the displacement of the control object is nonnegative;
(2) "0" to the first nonnegative integer coding device of the positive feedback device as a real number signal value and the target value for the displacement of the control object to the first nonnegative integer coding device of the negative feedback device as a real number signal value when the target value for the displacement of the control object is negative;
(3) the observation value of the displacement of the control object to the second nonnegative integer coding device of the positive feedback device as a real number signal value and "0" to the second nonnegative integer coding device of the negative feedback device as a real number signal value when the observation value of the displacement of the control object is nonnegative;
(4) "0" to the second nonnegative integer coding device of the positive feedback device as a real number signal value and the observation value of the displacement of the control object to the second nonnegative integer coding device of the negative feedback device as a real number signal value when the observation value of the displacement of the control object is negative;
(5) the observation value of the differentiated displacement of the control object to the third nonnegative integer coding device of the positive feedback device as a real number signal value and "0" to the third nonnegative integer coding device of the negative feedback device as a real number signal value when the observation value of the differentiated displacement of the control object is nonnegative; and
(6) "0" to the third nonnegative integer coding device of the positive feedback device as a real number signal value and the observation value of the differentiated displacement of the control object to the third nonnegative integer coding device of the negative feedback device as a real number signal value when the observation value of the differentiated displacement of the control object is negative,
wherein said feedback control device further comprises:
an operation output unit that operates on the processor for outputting to the control object a value obtained by subtracting the operation value output from the negative feedback device from the operation value output from the positive feedback device as an operation output, and
wherein each of the first, second, third, fourth, "B1", "B2" and "C" nonnegative integer coding devices comprises:
N neuron devices;
a nonnegative real number reception unit that operates on the processor for receiving one or multiple nonnegative real number signal values at time intervals of said N neuron devices receiving input signal values and outputting output signal values, and outputting the sum total u of the nonnegative real number signal values to said N neuron devices as an input signal value; and
a nonnegative integer output unit that operates on the processor for outputting the sum total of the output signal values from said N neuron devices as a nonnegative integer signal value,
wherein each of said N neuron devices comprises:
a threshold storage unit that operates on the processor for storing a threshold variable $\theta$ and two threshold coefficients $\Delta\theta 1$ and $\Delta\theta 2$;
an input reception unit that operates on the processor for receiving one or multiple input signal values at predetermined time intervals;
an output unit that operates on the processor for outputting, as an output signal value, a value "1" for indicating that the neuron device is firing when the sum total s of received input signal values is equal to or greater than the value of said stored threshold variable $\theta$, and otherwise a value "0" for indicating that the neuron device is resting; and
a threshold updating unit that operates on the processor for calculating:

$$\Delta\theta 1 X + \Delta\theta 2(X-1)$$

using said output signal value X and said stored threshold coefficients $\Delta\theta 1$ and $\Delta\theta 2$, and updating the value of the threshold variable $\theta$ stored in said threshold storage unit by increasing the threshold variable $\theta$ by the calculation result.

* * * * *